Patented May 6, 1930

1,757,906

UNITED STATES PATENT OFFICE

FRITZ HEFTI, OF ALTSTETTEN, NEAR ZURICH, SWITZERLAND

BARBITURIC-ACID COMPOUND

No Drawing. Application filed August 2, 1928, Serial No. 297,118, and in Switzerland March 9, 1928.

It has been discovered that by melting of allylphenylbarbituric-acid and 4-dimethyl-amino-2-3-dimethyl-1-phenyl-5-pyrazolon a compound is obtained which is most efficient and valuable analgetica and sedativa remedia.

Example 24,4 gms. of phenylallylbarbituric acid and 23,1 gms. 4-dimethylamino-2-3-dimethyl-1-phenyl-5-pyrazolon are heated and molten at 115° C. the mass being stirred continuously. The product obtained has a yellowish colour and a melting point of 110-113° C. It is easily soluble in alcohol, acetone and ether but little soluble in hot ligroin and hardly soluble in cold water.

What I wish to secure by U. S. Letters Patent, is:—

As a new compound the product of the interaction of phenyl-allylbarbituric acid and 1-phenyl-2,3-dimethyl-4-dimethylamino-5-pyrazolon which possess valuable hypnotic and analgetic properties.

In testimony whereof I affix my signature.

FRITZ HEFTI.